United States Patent [19]
Suda et al.

[11] Patent Number: 5,499,051
[45] Date of Patent: Mar. 12, 1996

[54] MULTI-LENS IMAGE PICKUP APPARATUS HAVING UNSHARPNESS CORRECTING MECHANISM

[75] Inventors: Shigeyuki Suda, Yokohama; Yukichi Niwa, Narashino; Tatsushi Katayama, Kawasaki, all of Japan

[73] Assignee: Canon Kabushiki Kaisha, Tokyo, Japan

[21] Appl. No.: 498,042

[22] Filed: Jun. 30, 1995

Related U.S. Application Data

[63] Continuation of Ser. No. 34,361, Mar. 19, 1993, abandoned.

[30] Foreign Application Priority Data

Mar. 23, 1992 [JP] Japan ..................... 4-065169

[51] Int. Cl.$^6$ .................................. H04N 5/225
[52] U.S. Cl. ............... 348/218; 348/219; 348/47; 359/462; 354/113; 352/60
[58] Field of Search .................. 348/42, 46, 47, 348/48, 49, 207, 239, 218, 219, 239; 359/462; 354/112, 113; 352/57, 59, 60, 62; H04N 5/225, 5/335

[56] References Cited

U.S. PATENT DOCUMENTS

| | | | |
|---|---|---|---|
| 4,924,247 | 5/1990 | Suzuki | 354/164 |
| 4,924,317 | 5/1990 | Hirao | 358/227 |
| 5,003,385 | 3/1991 | Sudo | 358/88 |
| 5,045,930 | 9/1991 | Hasegawa | 358/60 |
| 5,101,268 | 3/1992 | Ohba | 358/88 |
| 5,138,444 | 8/1992 | Hiramatsu | 358/88 |
| 5,142,357 | 8/1992 | Lipton | 358/88 |

FOREIGN PATENT DOCUMENTS

| | | | |
|---|---|---|---|
| 0335004 | 10/1989 | European Pat. Off. | H04N 13/02 |
| 60-134671 | 7/1985 | Japan | H04N 5/225 |
| 63-095784 | 4/1988 | Japan | H04N 5/232 |
| 63-173475 | 7/1988 | Japan | H04N 5/335 |
| 2226923 | 7/1990 | United Kingdom | G01S 11/00 |

OTHER PUBLICATIONS

European Patent Office Communication, Application No. 93104672.6, Date Aug. 17, 1993, p. 1.
European Search Report, Application Number EP 93 10 4672, Date of completion of the search Aug. 10, 1993, pp. 1, 2.
Annex to the European Search Report on European Patent Application No. EP 93 10 4672, Aug. 10, 1993, p. 1.
"Acquistion of Super High Definition Pictures by Processing Stereoscopic Images", Institute of Image Electronic Engineering of Japan, Mar. 4, 1990.

*Primary Examiner*—Michael T. Razavi
*Assistant Examiner*—Ngoc-Yen Vu
*Attorney, Agent, or Firm*—Morgan & Finnegan

[57] ABSTRACT

A multi-lens imaging apparatus comprises a plurality of imaging optical systems in which an angle formed by optical axes is varied by inclining an optical axis of at least one optical system between a first state and a second state, and a plurality of image sensing means for detecting an image of an object imaged through the imaging optical systems. A photosensitive surface of the image sensing means corresponding to the at least one optical system is inclined with respect to the optical axis, and the inclined angle is established between an imaging surface being conjugated with the object surface in the first state and an imaging surface being conjugated with the subject surface in the second state, thereby reducing unsharpness amount generating at the periphery portions of the screen.

7 Claims, 10 Drawing Sheets

MULTI-LENS IMAGE PICKUP APPARATUS HAVING UNSHARPNESS CORRECTING MECHANISM

This is a continuation of application Ser. No. 08/034,361, filed on Mar. 19, 1993, now abandoned.

BACKGROUND OF THE INVENTION

1. Field of the Invention

The present invention relates to a multi-lens imaging apparatus, and more particularly to a multi-lens imaging apparatus for providing a highly fine single image by synthesizing two images having been obtained by imaging a common object through two sets of imaging systems.

2. Related Background Art

Principles of a multi-lens imaging apparatus have been proposed as shown in FIG. 1 for providing a highly fine single image by synthesizing two images having been obtained by imaging a common object through two sets of imaging systems. Namely, in such principles of the multi-lens imaging apparatus, a left-side imaging system 110L and a right-side imaging apparatus 110R are provided at the ideal situation for imaging an object 101 with a ½ pitch of divergence of sampling point in space phase therebetween. An image IL obtained by the left-side imaging system 110L and an image IR obtained by the right-side imaging system 110R are synthesized by a microprocessor (hereinafter referred to as "CPU") 120 to provide a highly fine single output image IOUT compared to a case where the object is imaged by a single imaging system.

FIG. 2 is a drawing for explanation of the basic disposition of the left-side imaging system 110L and the right-side imaging system 110R.

The left-side imaging system 110L is composed of a left-side imaging optical system 111L and a left side image sensor 112L, and in the same manner, the right-side imaging system 110R is composed of a right-side imaging optical system 111R and a right-side image sensor 112R. The left-side imaging optical system 111L and the right-side imaging optical system 111R have equivalent specifications, and are composed of zoom lens. Also, the left-side image sensor 112L and the right-side image sensor 112R have equivalent specifications, and are composed of imaging tube such as sachicon, or solid-state imaging element such as CCD. The left-side imaging system 110L and the right-side imaging system 110R are disposed on positions where they substantially intersect each other at a point O on an object surface 102, and are linearly symmetrical with respect to a normal line O–O of the object surface 102. In this case, when angles formed by optical axes LL, LR and the normal line O–O of the object surface 102 are respectively referred to as θ, the expression 2θ is defined as a convergent angle.

In this conventional multi-lens imaging apparatus, when the object distance is changed, the imaging is performed for example by changing the convergent angle 2θ by rotating the left-side imaging system 110L and the right-side imaging system 110R in accordance with the change of the object distance with x mark as a center in FIG. 2.

However, in the aforementioned conventional multi-lens imaging apparatus, as the object distance becomes shorter (i.e. the convergent angle 2θ becomes larger) a photosensitive surface (image surface) at periphery portions of the left-side image sensor 112L and the right-side image sensor 112R become out of conjugation so as to increase the unsharpness of the image. This problem will now be described in detail with reference to FIG. 3.

If, with respect to a material point P1 on the object surface 102, there are designated respectively: unsharpness amount on a flat surface 200 conjugated with the photosensitive surface at the periphery portion of the right-side image sensor 112R, by δ; a distance from a front-side main point H of the right-side imaging optical system 111R to the flat surface 200, by S0; a distance from the front-side main point H of the right-side imaging optical system 111R to the object point P1, by S1; and an effective pupil diameter of the right-side imaging optical system 111R, by D, they can be represented by the following equations:

$$\delta/D = (S0-S1)/S1 \tag{1}$$

$$S0-S1 = S0/(1+D/\delta) \tag{2}$$

Further, if the unsharpness amount with respect to the object point P1 on the photosensitive surface at the periphery portion of the right-side image sensor 112R is designated by δ' and the imaging magnification (lateral magnification) of the right-side imaging optical system 111R is designated by β, they can be represented as follows:

$$|\delta'| = |\beta \cdot \delta| \tag{3}$$

If the length of a line segment from the object point P1 to the optical axis LR is designated by η, they can be represented by:

$$S0-S1 = \eta \cdot \tan(\theta) \tag{4}$$

Furthermore, if the length from an intersection of a line connecting the front-side main point H of the right-side imaging optical system 111R to the object point P1 with the flat surface 200 to an intersection P0 of the optical axis LR with the flat surface 200, they can be represented by:

$$\eta/y = S1/S0 \tag{5}$$

Therefore, the equation (5) can also be expressed as follows:

$$\eta = y \cdot S1/S0 \tag{6}$$
$$= y \cdot \{1 - (S0-S1)/S0\}$$

Substituting the equation (2) for (S0–S1), the equation (6) can be represented as follows:

$$\eta = y \cdot \{1 - 1/(1+D/\delta)\} \tag{7}$$
$$= y \cdot \{(D/\delta)/(1+D/\delta)\}$$

Since the equation (4) can be alternatively expressed as:

$$\tan(\theta) = (S0\ S1)n \tag{8}$$

As a result, the equations (2) and (7) can also be expressed as follows:

$$\tan(\theta) = S0/\{y \cdot (D/\delta)\} \tag{9}$$

On the other hand, a focusing distance of the right-side imaging optical system ! 11R is designated by f and the F number is designated by F, the following relationship exists:

$$D/\delta = (f \cdot \beta)/(F \cdot \delta') \tag{10}$$

Here, the following relationship exists:

$$S0 = f \cdot (1/\beta - 1) \tag{11}$$

$$y = y'/\beta \tag{12}$$

Accordingly, the equation (9) can be expressed as follows:

$$\tan(\theta) = f \cdot (1/\beta - 1) \cdot F \cdot \delta'/(f \cdot \beta \cdot y) \quad (13)$$
$$= F \cdot \delta' \cdot (1/\beta - 1)/y'$$

Therefore, the following relationship exists:

$$\delta' = y' \cdot \tan(\theta)/\{F \cdot (1/\beta - 1)\} \quad (14)$$

The unsharpness of amount δ represented by the equation (14) takes place at the photosensitive surface of the periphery portion of the right-side image sensor 112R to degrade the contrast of the image particularly in case of short-distance imaging. The same is true in the left-side image sensor 112L.

SUMMARY OF THE INVENTION

It is therefore an object of the present invention to provide a multi-lens imaging apparatus which is capable of providing a highly fine images all over the screen and of being difficult to generate the unsharpness of the image particularly even in case of short-distance imaging.

A multi-lens imaging apparatus according to this invention comprises a plurality of imaging optical systems in which an angle formed by respective optical axis is varied by inclining an optical axis of at least one optical system between the first condition and the second one and a plurality of image sensors for detecting an image of an object having been imaged through the imaging optical systems, wherein a photosensitive surface of the image sensing means corresponding to the at least one optical system is inclined with respect to the optical axis by an angle which is set between an imaging surface conjugated with an object surface in the first state and an imaging surface conjugated with the object surface in the second state.

Further, according to the pre sent invention, the photosensitive surface of each image sensor is inclined with respect to a surface perpendicular to the optical axis of each imaging system by $0.5 \cdot \tan^{-1}\{\beta_0 \cdot \tan(\theta_0)\}$, so as to reduce a maximum amount of unsharpness generating at periphery portions of a screen approximately to the half by principles described later.

The present invention apparatus is further characterized in that the apparatus includes a plurality of imaging optical systems in which the angle formed by the optical axes changes, a plurality of image sensing means for detecting the image of the object through the imaging optical systems and a means for substantially aligning, in accordance with the change of the angle formed by the optical axes, a gradient of the imaging surface of the object for imaging through the imaging optical systems with a gradient of the photosensitive surface of the image sensing means.

Further, the present invention includes a means for inclining the photosensitive surfaces of the image sensors so that the photosensitive surface of the image sensors substantially conjugate the surface of the object with respect to the optical axis of the imaging optical systems. As a result, due to principles described later, the occurrence of the unsharpness can be prevented for all over the screen irrespective of a distance to the object surface.

The above and other advantages, features and additional objects of this invention will be manifest to those versed in the art upon making reference to the following detailed description and the accompanying drawings in which a structural embodiment incorporating the principles of this invention is shown by way of illustrative example,

BRIEF DESCRIPTION OF THE DRAWINGS

FIGS. 4A and 4B show an embodiment of the multi-lens imaging apparatus wherein FIG. 4A is a schematic structural view showing composition of the left-side imaging system and the right-side imaging system and FIG. 4B is a diagram showing the disposition of the left-side and right-side imaging systems;

FIGS. 7A, 7B and 7C are diagrams for explanation of amount of unsharpness generated in the multi-lens imaging apparatus shown in FIGS. 4A and 4B. wherein FIG. 7A is for explanation of unsharpness amount in case of long object distance. FIG. 7B is a diagram for explanation of unsharpness amount in case of an intermediate object distance, and FIG. 7C in a diagram for explanation of the unsharpness amount in case of short object distance.

FIGS. 9A and 9B show another embodiment of the multi-lens imaging apparatus according to the present invention, wherein FIG. 9A is a schematic structural diagram showing the left-side imaging system and the right-side imaging system respectively and FIG. 9B is a block diagram for explanation of the operation of arithmetic control unit;

FIGS. 10A and 10B show another embodiment of the double-eye imaging apparatus according to the present invention, wherein FIG. 10A is a diagram for explanation of the operation of the image sensor driving system and FIG. 10B is a block diagram for explanation of the image combining operation;

DETAILED DESCRIPTION OF THE PREFERRED EMBODIMENTS

An embodiment of the present invention will now be described with reference to the accompanying drawings.

Figure 1:
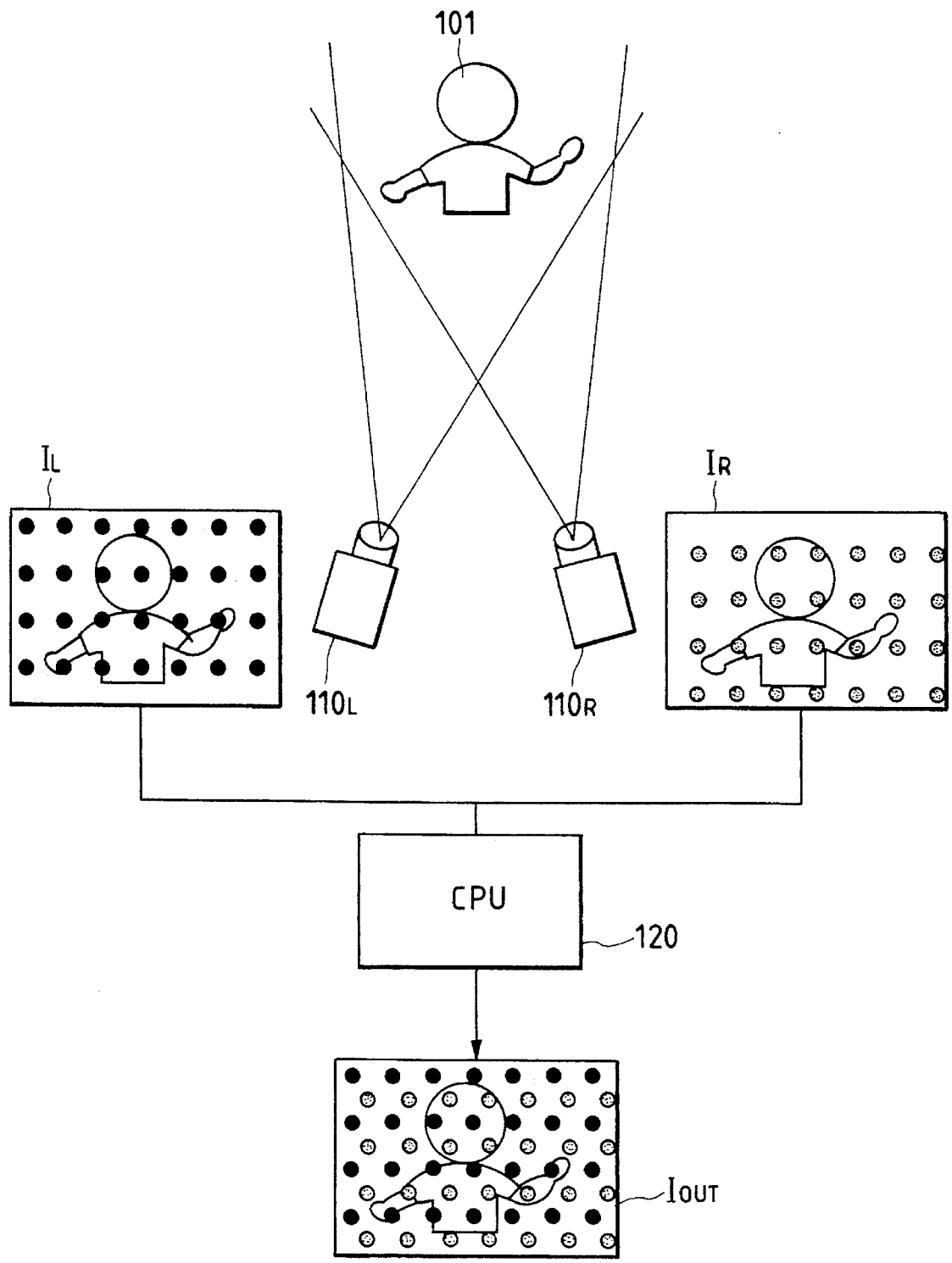
FIG. 1 is a diagram for explanation of the principles of a multi-lens imaging apparatus for providing a highly fine single image by synthesizing two images having-been obtained through two imaging systems.
Figure 2:
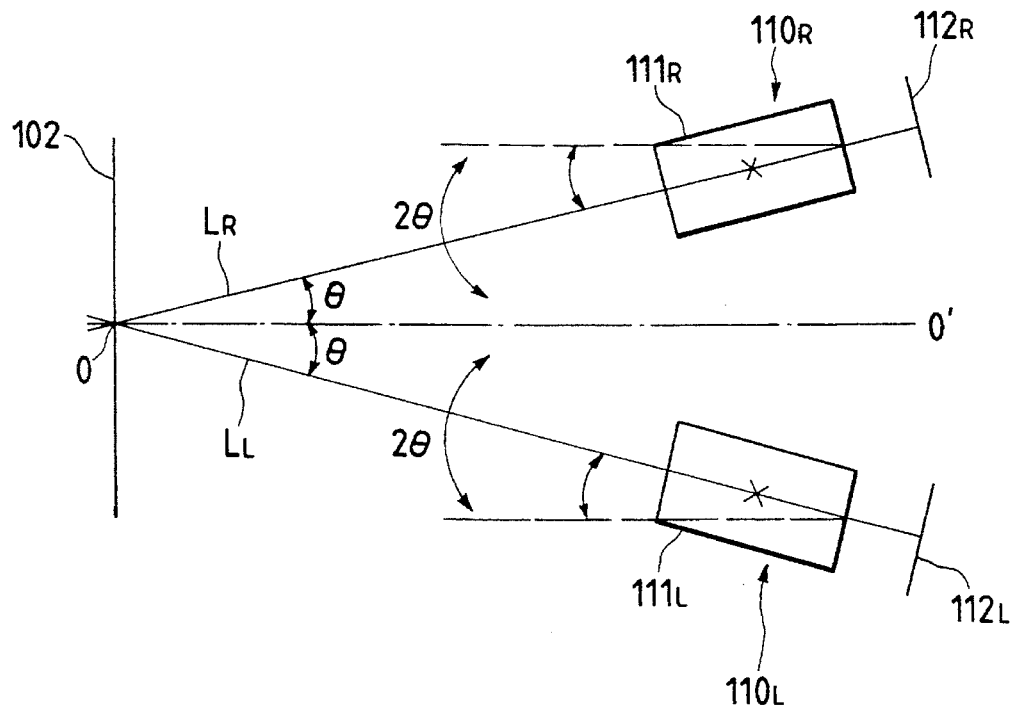
FIG. 2 is a drawing for explanation of the basic arrangement of the left-side imaging system and the right-side imaging system shown in FIG. 1.
Figure 3:
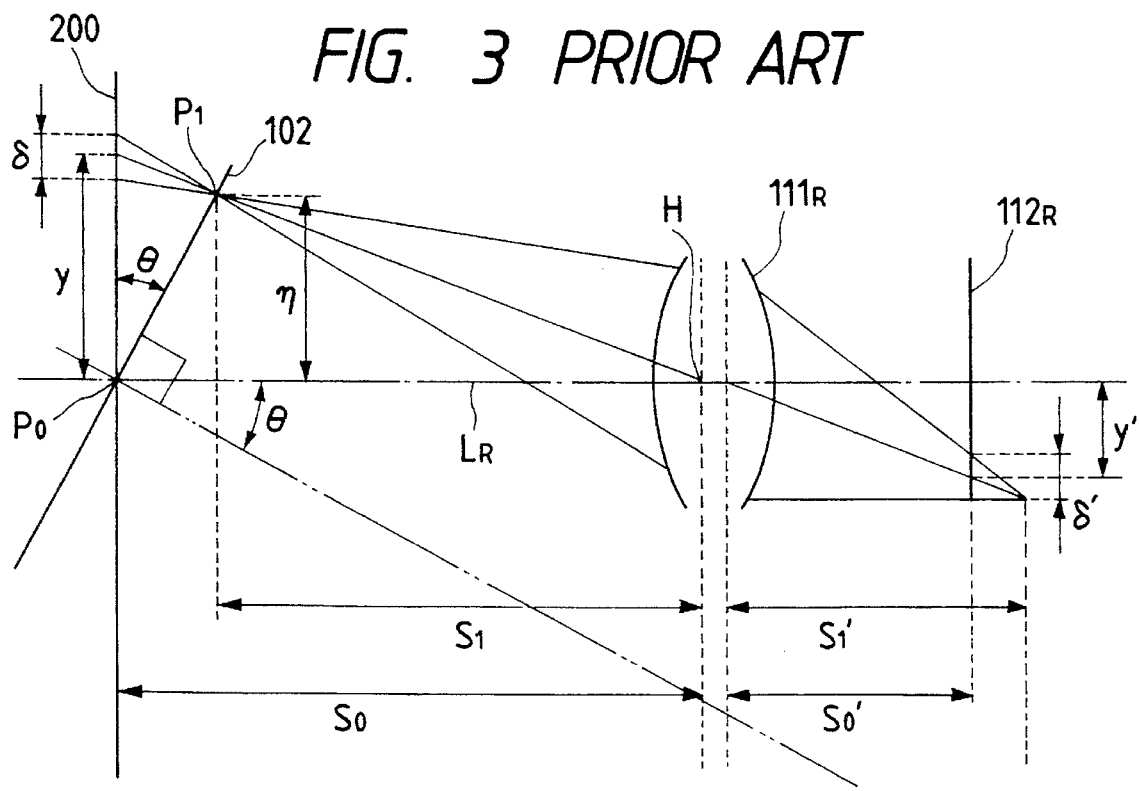
FIG. 3 is a drawing for explanation of a problem in a conventional multi-lens imaging apparatus.
Figure 4A:
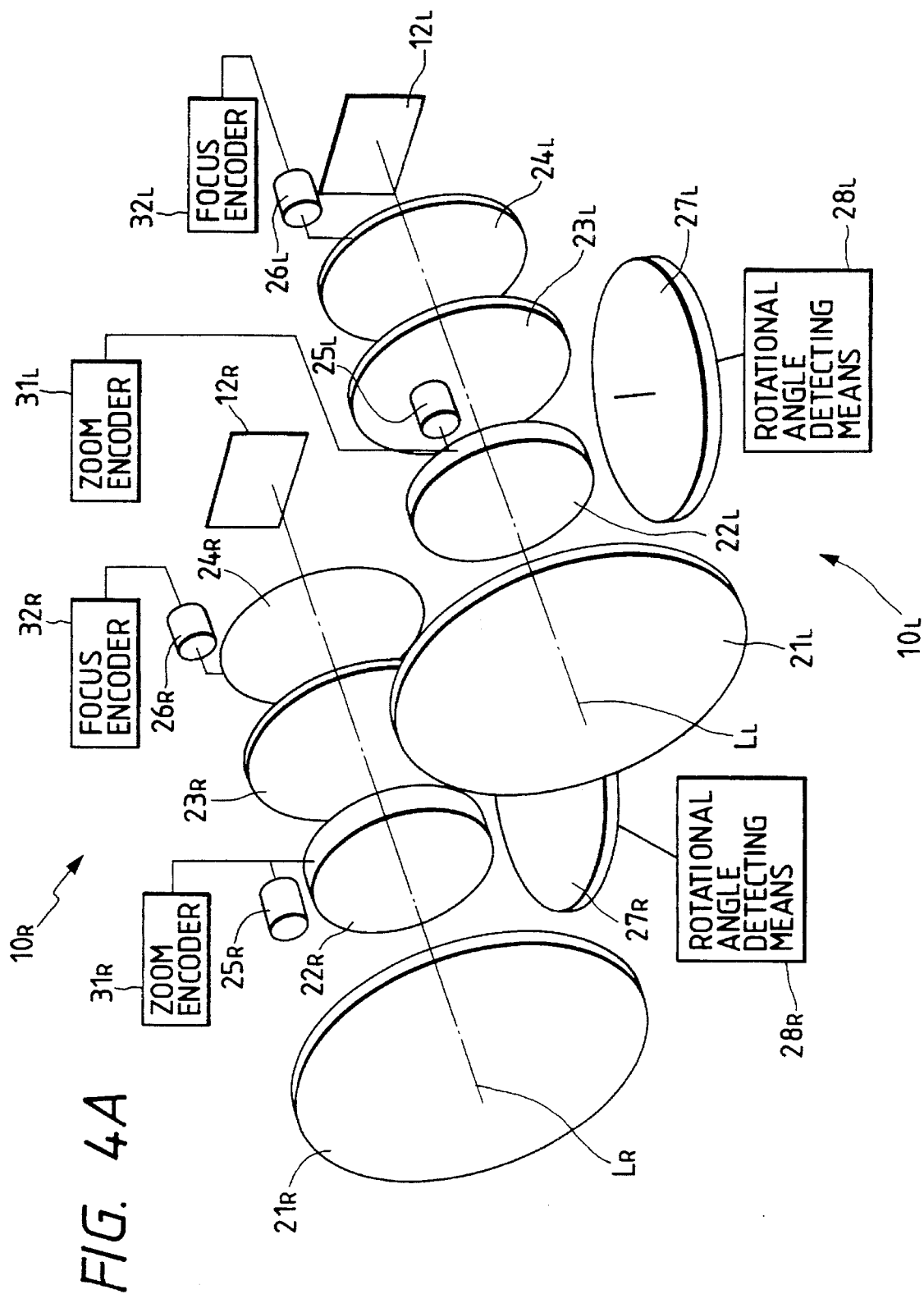
Figure 4B:
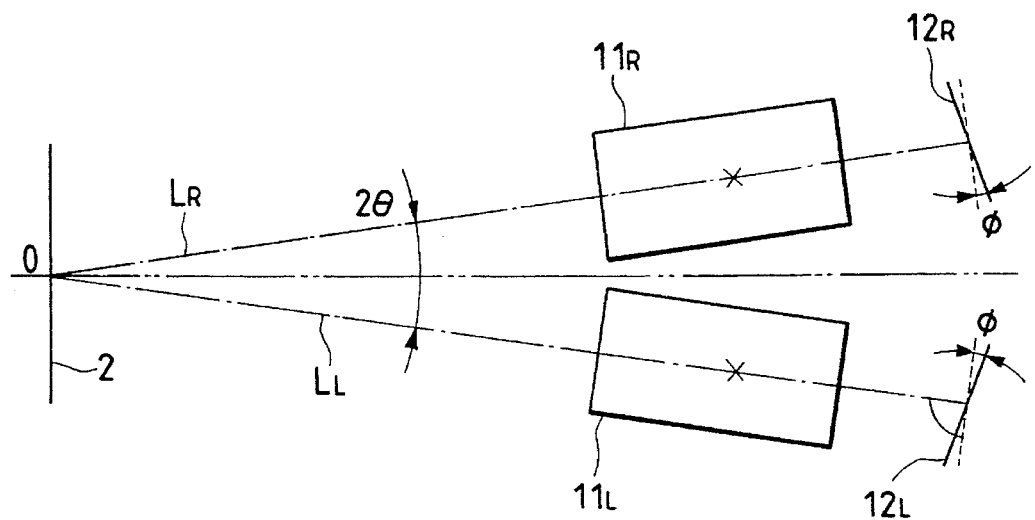

FIGS. 4A and 4B show a first embodiment of a multi-lens imaging apparatus according to the present invention.

The multi-lens imaging apparatus of this embodiment provides a highly fine single image by synthesizing two images obtained by imaging a common object by use of two sets of imaging systems (a left-side imaging system 10L and a right-side imaging system 10R).

As shown in FIG. 4A, the right-side imaging system 10R comprises: a group of lens 21R–24R including a variable power group 22R and a focusing group 24R which form a right-side imaging optical system 11R; a zoom motor 25R as a driving system for driving the variable power group 22R; a focus motor 26R as a driving system for driving the focusing group 24R; a mechanism system (not shown) and a driving system (convergent angle motor 27R)for integrally driving the right-side imaging optical system 11R and the left-side image sensor 12R within a plane including an optical axis LR; a rotational angle detecting means 28R for detecting a rotational angle of the convergent angle motor 27R; a zoom encoder 31R disposed on the zoom motor 25R for detecting a focus distance f of the right-side imaging optical system 11R; and a focus encoder 32R for detecting an object distance with respect to the right-side imaging optical system 11R. The left-side imaging system 10L is synthesized in the same manner as the right-side imaging system 10R.

Here, it is assumed that the focus motor 26L and the zoom motor 25L of the left-side imaging optical system 11L are controlled separately by a signal from the focus encoder 32L and a signal from the zoom encoder 31L respectively, while the focus motor 26R and the zoom motor 25R of the right-side imaging optical system 11R are controlled separately by a signal from the focus encoder 32R and a signal from the zoom encoder 31R respectively, so that the focus distance of the left-side imaging optical system 11L and the focus distance f of the right-side imaging optical system 11R are always accorded, and that the 10 imaging magnification of the left-side imaging optical system 11L and the imaging magnification of the right-side imaging optical system 11R are always accorded.

Further, the photosensitive surfaces of the left-side image sensor 12L and the right-side image sensor 12R are, as shown in FIG. 4B, established to incline with respect to surfaces perpendicular to the optical axes LL and LR of the left-side imaging system 10L and the right-side imaging system 10R respectively by approximately the following angle amount:

$$\phi = 0.5 \cdot \tan^{-1}\{\beta_0 \cdot \tan(\theta_0)\} \qquad \}(15)$$

where $2\theta_0$: maximum convergent angle; $\beta_0$: maximum imaging magnification of the left-side imaging system 10L and the right-side imaging system 10R.

Next, a method for overcoming the aforementioned problem in the conventional multi-lens imaging apparatus will be described with reference to FIG. 5.

An imaging relationship of an object (shown by line segment PQ) having a gradient $\omega$ with respect to the optical axis LR of the right-side imaging system 10R is considered. The points P and P' are conjugated points on the optical axis LR at an imaging magnification (lateral magnification) through the right-side imaging optical system 11R. Further, the characters designate respectively: Q' which is an image point of a point Q lying out of the optical axis LR; $\omega$, an angle formed by the line segment PQ and the optical axis LR; $\omega'$, an angle formed by a line segment P'Q' and the optical axis LR; R, an intersection of an extended line of the line segment PQ with an extended line on a front-side main flat surface of the right-side imaging optical system 11R; and T, an intersection of an extended line of the line segment P'Q' with an extended line of rear-side main flat surface of the right-side imaging optical system 11R. Further, there is the following relationship as seen from FIG. 5:

$$HR = S \cdot \tan(\omega) \qquad (16)$$

$$H'T = S' \cdot \tan(\omega') \qquad (17)$$

where: H, a front-side main point of the right-side imaging optical system 11R; and H', a rear-side main point of the right-side imaging optical system 11R. If the point Q is sufficiently close to the point P, there is a following relationship when the longitudinal magnification equals to a square of the lateral magnification:

$$\begin{aligned} S' \cdot \tan(\omega') &= \beta \cdot S \cdot \beta^2 \cdot q/(\beta \cdot p) \\ &= S \cdot \tan(\omega) \end{aligned} \qquad (18)$$

where: q, length of perpendiculars from the point Q to the optical axis LR; p, distance between an intersecting point of the perpendiculars with the optical axis LR and the point P; p' and q', conjugated distance and length at the image area side corresponding to the distance p and the length q respectively. From the equations (16)–(18), the following relationship is established:

$$HR = H'T \qquad (19)$$

Therefore, diagrammatically it is seen that a plane including the conjugated plane P'Q' can be obtained by coupling a point T satisfying the relationship of HR=H'T to a point P' after finding the point R by extending the line segment PQ. Also, since the equation (18) can be alternatively expressed as:

$$\begin{aligned} \tan(\omega')/\tan(\omega) &= S/S' \\ &= 1/\beta, \end{aligned} \qquad (20)$$

the gradient angle $\omega'$ at which the right-side image sensor 12R is conjugated can be obtained by finding the imaging magnification (lateral magnification) $\beta$ and the gradient angle $\omega$ of the object (line segment PQ). In other words, by inclining the right-side image sensor 12R only by the gradient angle $\omega'$ defined by the eqaution (20), the generation of the unsharpness aforementioned can be prevented.

Figure 5:
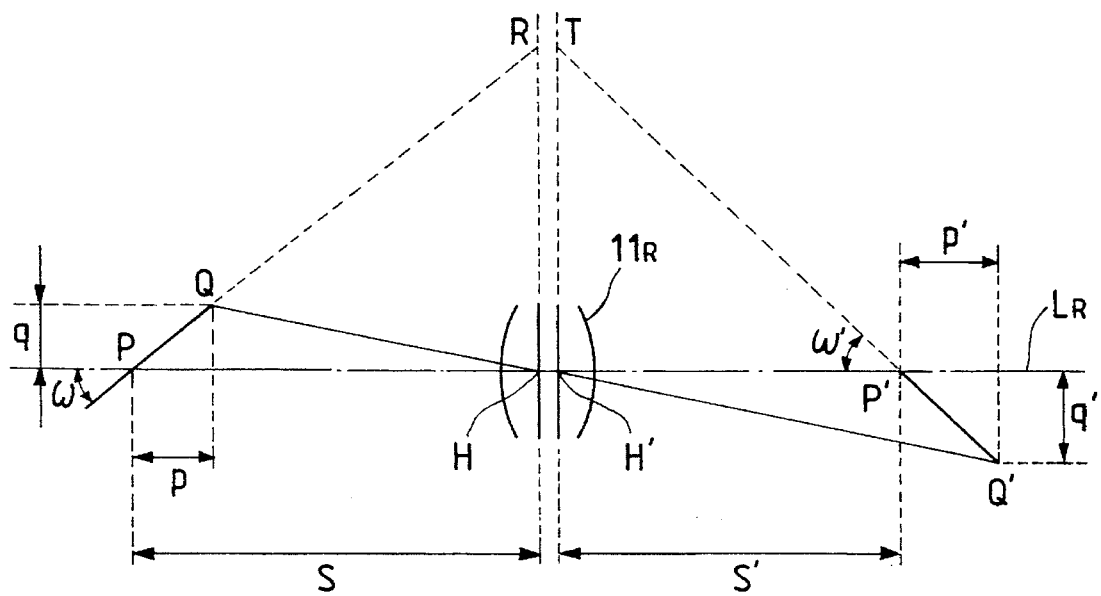
FIG. 5 is a diagram for explanation of a method for overcoming problems in the conventional multi-lens imaging apparatus using the multi-lens imaging apparatus shown in FIGS. 4A and 4B.

Further, the relationship between the angle $\omega$ formed by the object (line segment PQ) and the optical axis LR of the right-side imaging optical system 11R and the aforementioned convergent angle $2\theta$ can be obtained from:

$$\theta = 90° - \omega \qquad (21),$$

as shown in FIG. 5. Therefore, from the equations (20) and (21), the angle $\phi$ formed by the photosensitive surface of the right-side image sensor 12R and the surface perpendicular to the optical axis LR can be represented as follows:

$$\phi = \tan^{-1}\{\beta \cdot \tan(\theta)\} \qquad (22)$$

Therefore, if an object range from an infinite remoteness to a very close distance is considered, the angle $\phi$ formed by the photosensitive surface of the right-side image sensor 12R and the surface perpendicular to the optical axis LR must be "0" when the object distance is infinitely remote, and must be $\phi$ MAX when the object distance is very close. The maximum value $\phi$ MAX can be represented as follows from the equation (22):

$$\phi\text{MAX} = \tan^{-1}\{\beta_0 \tan(\theta_0)\} \qquad (23)$$

From foregoing results, any unsharpness can be prevented from generating by varying the angle $\phi$ formed by the photosensitive surface of the right-side image sensor 12R and the surface perpendicular to the optical axis LR from "0" to the maximum value φ MAX depending on a distance to the object, however, it is necessary to provide a means for varying the angle φ in accordance with a distance to the object.

Accordingly, in this embodiment, the angle formed by the photosensitive surface of the right-side image sensor 12R and the surface perpendicular to the optical axis LR (also the angle formed by the photosensitive surface of the left-side image sensor 12L and the surface perpendicular to the optical axis LR) is set always in accordance with the following formula, irrespective of the object distance:

$$\phi = 0.5 \cdot \phi\text{MAX} \qquad (24)$$
$$= 0.5 \cdot \tan^{-1}\{\beta_0 \cdot \tan(\theta_0)\}$$

Figure 6:
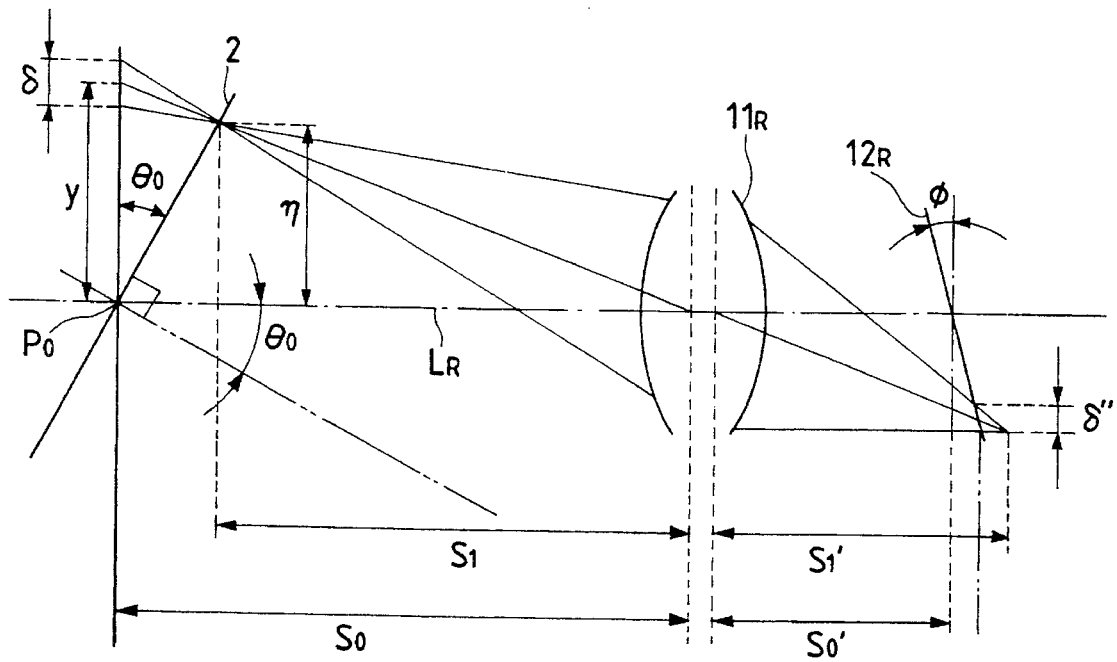
FIG. 6 is a diagram for explanation of amount of unsharpness generated in the multi-lens imaging apparatus shown in FIG. 4.
Figure 7A:
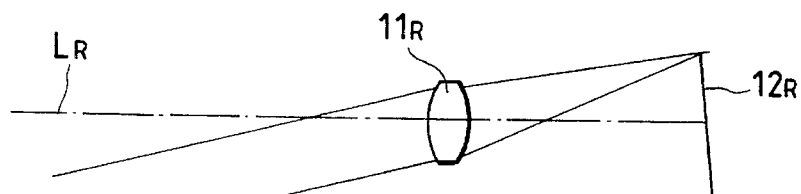
Figure 7B:
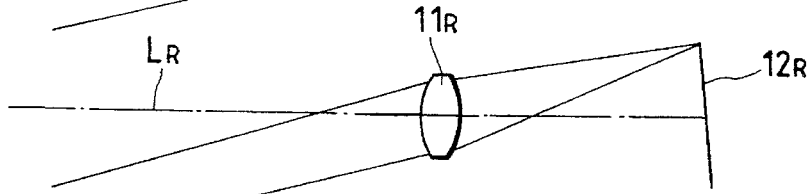
Figure 7C:
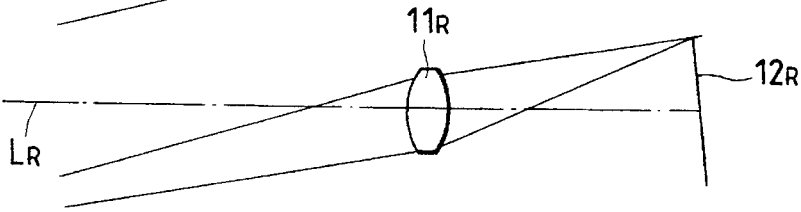

As a result, as shown in FIG. 6, the generating unsharpness amount δ can be reduced to approximately a half amount in comparison with the conventional multi-lens imaging apparatus. According to the multi-lens imaging apparatus of this embodiment, when the object distance is an intermediate distance, as shown in FIG. 7B, the object surface 2 and the photosensitive surface of the right-side image sensor 12R are substantially conjugated so as to prevent any unsharpness from generating. Further, when a distance to the object is long or short, as shown in FIGS. 7A and 7C, respectively, although at the periphery portion of the photosensitive surface of the right-side image sensor 12R becomes so-called forwardly focused or rewardly focused state to generate substantially the same unsharpness amount, the maximum unsharpness amount can be reduced to approximately a half of that in the conventional 10 multi-lens imaging apparatus.

In this embodiment, in case of intermediate distance, the object surface 2 and the photosensitive surface of the image sensor is set to substantially conjugate. Alternatively, even when the object surface of short distance or long distance case is conjugated with the photosensitive surface of the image sensor, the same effect reducing the maximum unsharpness amount can be obtained.

Figure 8:
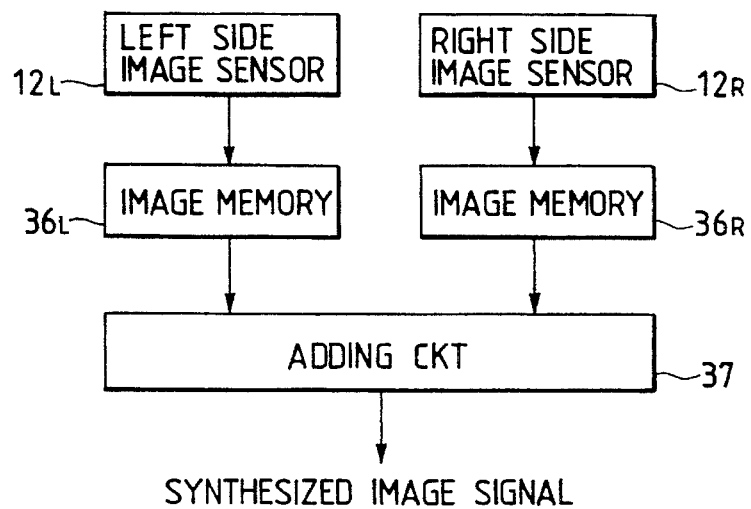
FIG. 8 is a block diagram for explanation of synthesizing operation of images in the multi-lens imaging apparatus shown in FIGS. 4A and 4B.

In the multi-lens imaging apparatus according to this embodiment, as shown in FIG. 8, a highly fine single composite image signal can be obtained, by temporarily storing the image signal from the left-side image sensor 12L in the image memory 36L and the image signal from the right-side image sensor 12R in the image memory 36R, and thereafter synthesizing both image signals in the adding process circuit 37.

As the rotational angle detecting means 28L, 28R, for example an external member such as a rotary encoder, or a means for detecting the rotational angle by a driving system itself such as a pulse motor can be used. Also, as the zoom encoders 31L, 31R and the focus encoders 32L, 32R, an external member such as a potentiometer, or a means for obtaining the positional information of the lens in the optical axis direction by the driving system itself such as a pulse motor can be used.

FIGS. 9A, 9B and FIGS. 10A, 10B show a second embodiment of the multi-lens imaging apparatus according to the present invention.

In the multi-lens imaging apparatus of this embodiment, a highly fine single image can be obtained by synthesizing two image s having been obtained by imaging a common object through two sets of imaging systems (the left-side imaging system 10L and the right-side imaging system 10R).

Figure 9B:
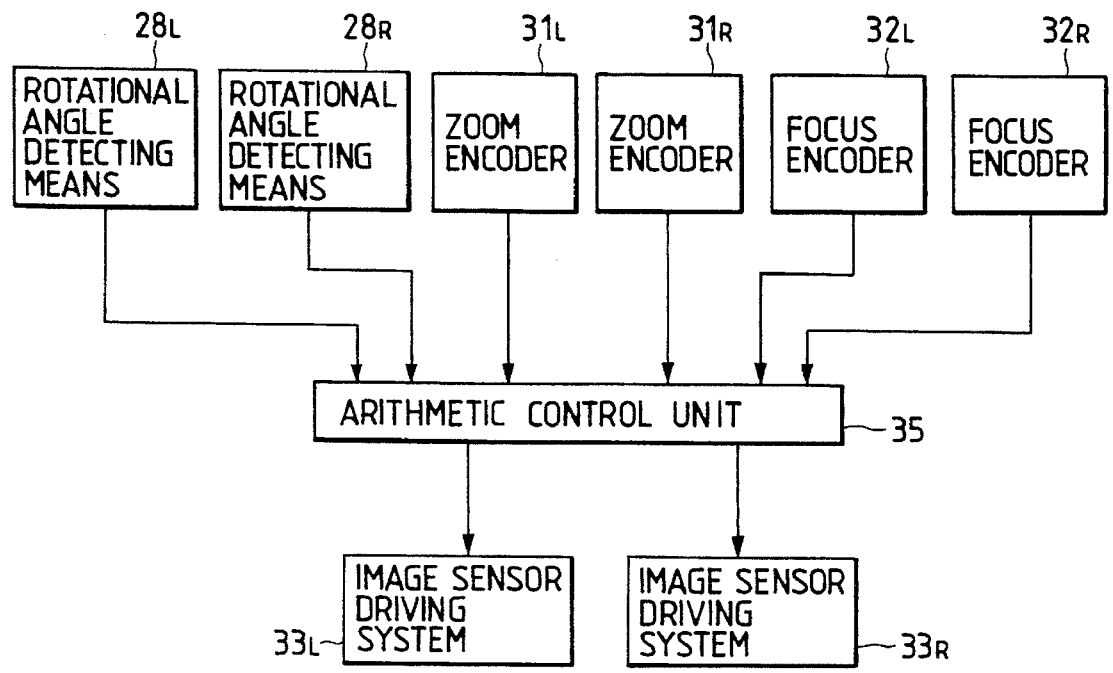
Figure 9A:
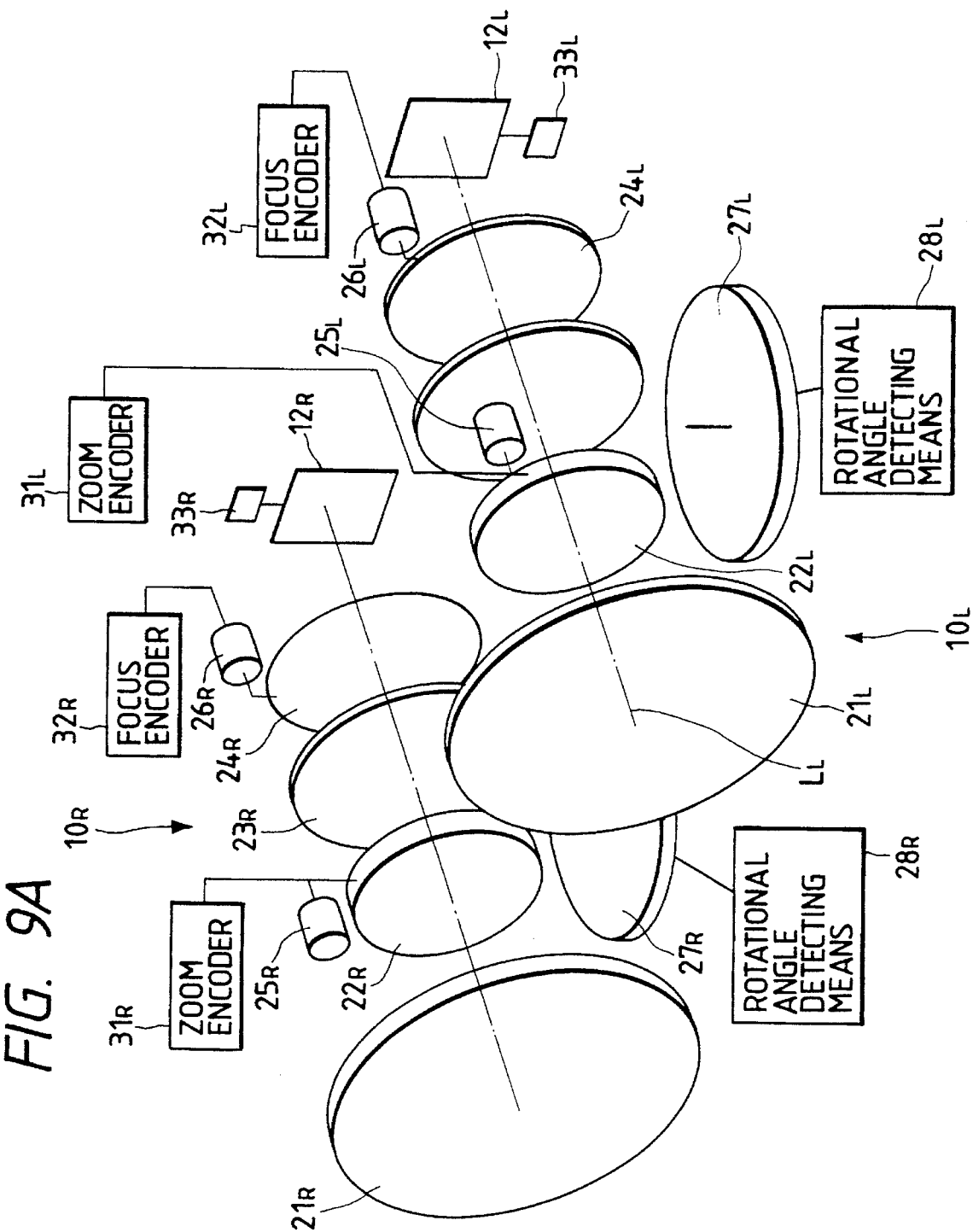
Figure 10A:
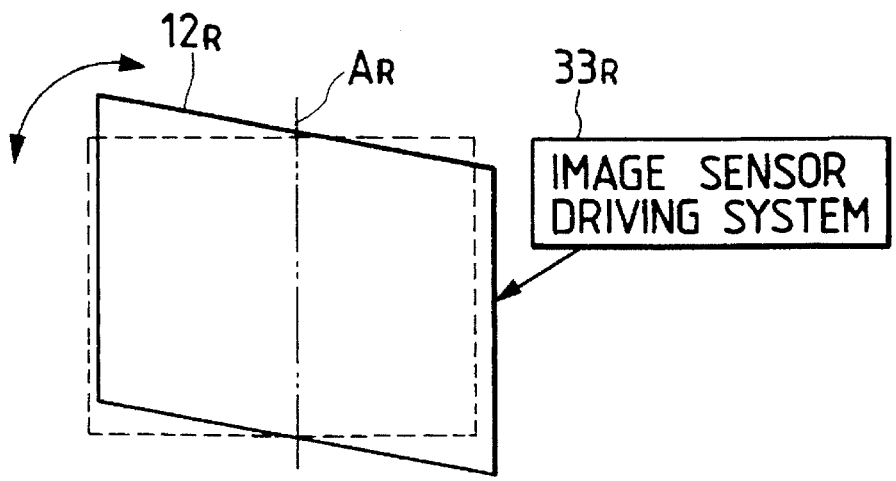

As shown in FIG. 9A, the right-side imaging system 10R comprises: a lens group 21R–24R including a variable power (magnification) group 22R and a focusing group 24R forming a right-side imaging optical system 11R; a zoom motor 25R as a driving system for driving the variable power group 22R; a focus motor 26R as a driving system for driving the focusing group 24R; a mechanism System (not shown) and a driving system (convergent angle motor 27R) for integrally rotating the right-side imaging optical system 11R and the right-side image sensor 12R within a plane including the optical axis LR; a rotational angle detecting means 28R for detecting a rotational angle of a convergent angle motor 27R; a zoom encoder 31R provided in the zoom motor 25R for detecting a focus distance f of the right-side imaging optical system 11R; a focus encoder 32R provided on the focus motor 26R for detecting the object distance with respect to the right-side imaging optical system 11R; and an image sensor driving system 33R capable of inclining the right-side image sensor 12R toward the horizontal direction. As shown in FIG. 10A, the image sensor driving system 33R rotates the photosensitive surface of the right-side image sensor 12R around an axis AR bisecting the photosensitive surface of the right-side image sensor 12R in the horizontal direction as a rotary axis. The left-side imaging system 10L is composed in the same manner as the right-side imaging system 10R.

The signals from the rotational angle detecting means 28L, the zoom encoder 31L and the focus encoder 32L of the left-side imaging system 10L and the signals from the rotational angle detecting means 28R, zoom encoder 31R and the focus encoder 32R of the right-side imaging system 10R are input to the arithmetic control unit 35 respectively as shown in FIG. 9B. The arithmetic control unit 35 controls the image sensor driving system 33L and the image sensor driving system 33R in accordance with the signals respectively. The operation of the arithmetic control unit 35 at this time will now be described.

Figure 11:
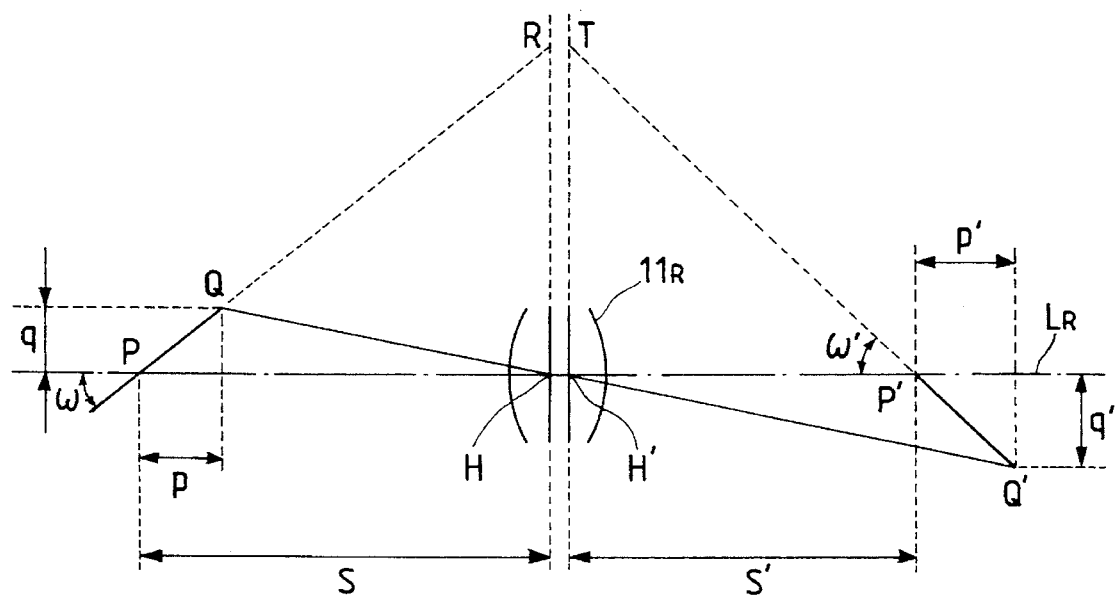
FIG. 11 is a diagram for explanation of a method for solving a problem in the conventional multi-lens imaging apparatus by use of the multi-lens imaging apparatus shown in FIGS. 9A and 9B.

First, a method to overcome the problems in the aforementioned conventional multi-lens imaging apparatus will be mentioned with reference to FIG. 11.

An image formation relationship of a object (shown by a line segment PQ) having a gradient ω with respect to the optical axis LR of the right-side imaging system 10R will be considered. The points P and P' are conjugated points on the optical axis LR with an imaging magnification (lateral magnification) by way of the right-side imaging optical system 11R. The codes designate respectively: Q', image point at the point Q out of the optical axis LR; ω, angle formed by the line segment PQ and the optical axis LR; ω, angle formed by the line segment P'Q' and the optical axis LR; R, intersection of an extended line of the line segment PQ with an extended line of the front-side main flat surface of the right imaging optical system 11R; and T, intersection of an extended line of the line segment P'Q' with an extended line of rear-side main flat surface of the right-side imaging optical system 11R. Further, there is a following relationship, as shown in FIG. 11:

$$HR = S \cdot \tan(\omega) \qquad (25)$$

$$H'T = S' \cdot \tan(\omega') \qquad (26)$$

where: H, front-side main point of the right-side imaging optical system 11R; H', rear-side main point of the right-side imaging optical system 11R. If the point Q is sufficiently close to the point P, there is a following relationship, when the longitudinal magnification equals to a square of the lateral magnification:

$$S' \cdot \tan(\omega') = \beta \cdot S \cdot \beta^2 \cdot q/(\beta \cdot p) \quad (27)$$
$$= S \cdot \tan(\omega)$$

where: q, length of perpendiculars from the point Q to the optical axis LR; p, distance between the intersection of the perpendiculars with the optical axis LR and the point P; p' and q', conjugated distance and length at the image area side corresponding to the distance p and the length q respectively. From the equations (25)–(27), a relationship HR=H'T (28) can be formulated.

Therefore, diagrammatically, it is understood that a plane including the conjugated plane P'Q' can be obtained by coupling the point T where HR=H'T to the point P' after obtaining the point R by extending the line segment PQ. Also, since an equation $\tan(\omega')/\tan(\omega)=S/S'=1/\beta(29)$ can be formulated from the equation (27), the gradient angle ω' at which the right-side image sensor 12R is conjugated by finding the imaging magnification (lateral magnification) and the gradient angle ω of the object (line segment PQ). That means the aforementioned unsharpness can be prevented from generating by inclining the right-side image sensor 12R only by the gradient angle ω' defined by the equation (29).

Further, the relationship between the angle ω formed by the object (line segment PQ) and the optical axis of the right-side imaging optical system 11R and the convergent angle 2θ can be obtained from the following equation as is clear from FIG. 11:

$$\theta = 90° - \omega \quad (30)$$

Here, it is constructed that the focus motor 26L and the zoom motor 25L of the left-side imaging optical system 11L are separately controlled by the signals from the focus encoder 32L and the zoom encoder 31L, while the focus motor 26R and the zoom motor 25R of the right-side imaging optical system 11R are separately controlled by the signals from the focus encoder 32R and those from the zoom encoder 31R, such that the focus distance f of the left-side imaging optical system 11L is always accorded with the focus distance f of the right-side imaging optical system 11R, and the imaging magnification β of the left-side imaging optical system 11L is always accorded with the imaging magnitude β of the right-side imaging optical system 11R.

The arithmetic control unit 35 can calculate the focus distance f of the left-side imaging optical system 11L by the signal from the zoom encoder 31L, and the focus distance f of the right-side imaging optical system 11R by the signal from the zoom encoder 31R. In addition, the arithmetic control unit 35 can calculate the object distance with respect to the left-side imaging optical system 11L by the signal from the focus encoder 32L, the imaging magnification β of the left-side imaging optical system can be obtained, and in the same manner, the imaging magnification β of the right-side imaging optical system 11R can be obtained by the signal from the focus encoder 32R. Further, the arithmetic control unit 35 can calculate the convergent angle 2e by the signal from the rotational angle detecting means 28L, 28R.

Figure 12:
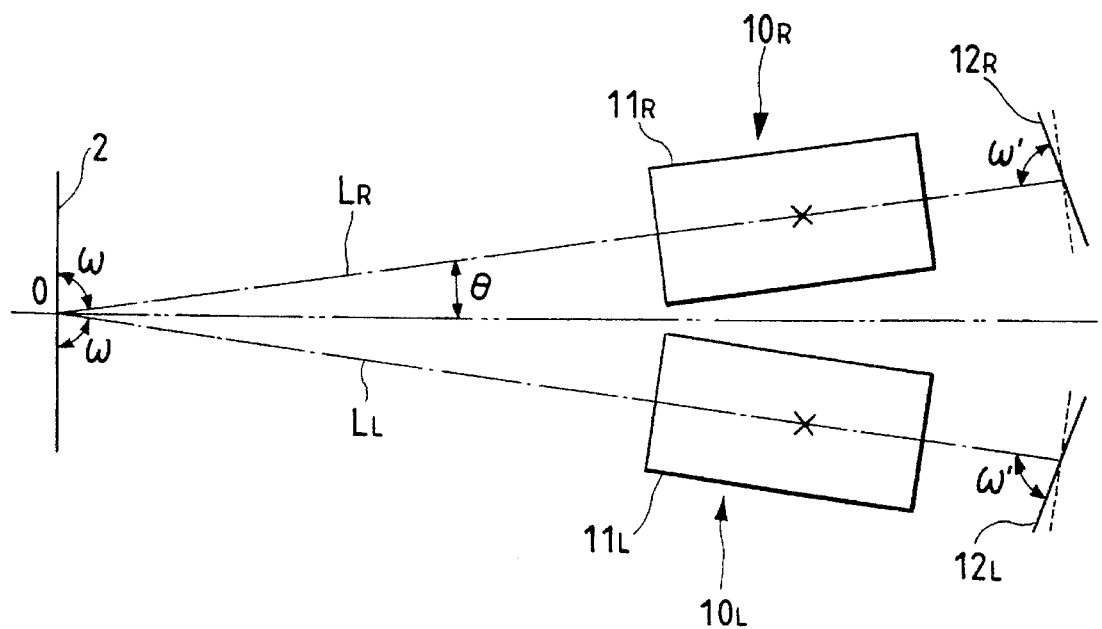
FIG. 12 is a diagram for explanation of a method for solving the problem in the conventional multi-lens imaging apparatus by use of the multi-lens imaging apparatus shown in FIGS. 9A and 9B.

Accordingly, the arithmetic control unit 35 can calculate the gradient angles ω' of the left-side image sensor 12L and the right-side image sensor 12R by substituting thus obtained imaging magnification β and the convergent angle 2θ for the equations (29) and (30), respectively. Consequently, the arithmetic control unit 35 controls the image sensor driving system 33L and 33R in accordance with the gradient angle ω' of the left-side image sensor 12L and the right-side image sensor 12R to incline them toward the horizontal direction as shown in FIG. 12, so as to form sharp images on the left-side image sensor 12L and the right-side image sensor 12R respectively.

Figure 10B:
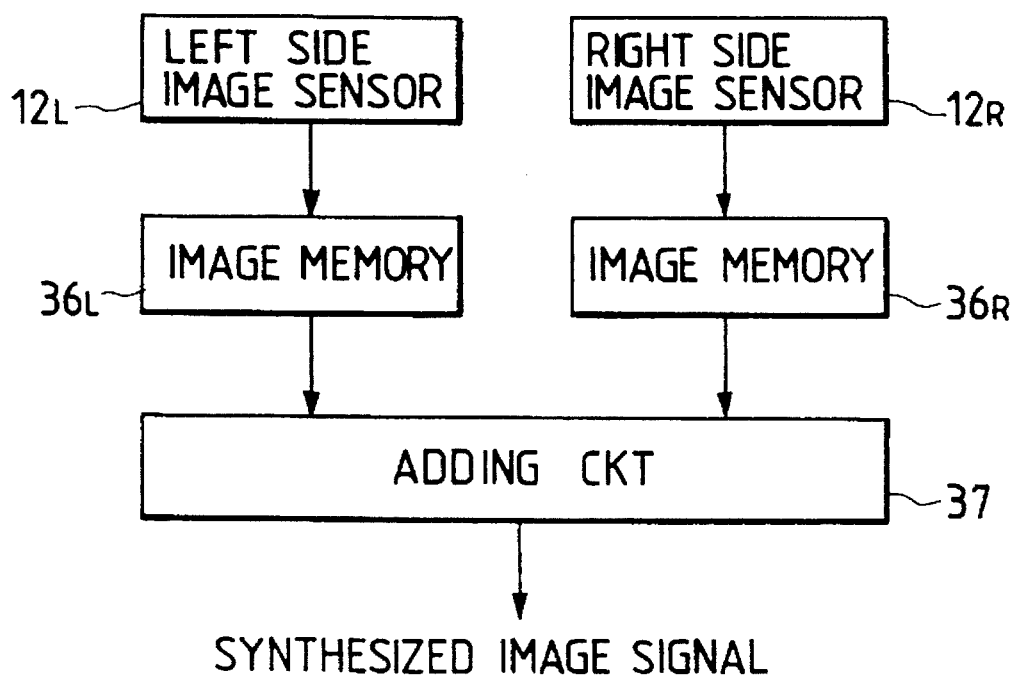

For this end, as shown in FIG. 10B, the image signal from the left-side image sensor 12L is temporarily stored in the image memory 36L and the image signal from the right-side image sensor 12R is temporarily stored in the image memory 36R. Thereafter, the image signals are synthesized in the adding process circuit 37 to provide a single highly fine synthesized image signal.

As the rotational angle detecting means 28L, 28R, an external member such as a rotary encoder, or a means for detecting the rotational angle by the driving system itself such as a pulse motor can be used. Further, as the zoom encoders 31L, 31R and the focus encoders 32L, 3 2R, external member such as a potentiometer or a means for detecting the positional information in the optical axis direction of the lens by the driving system itself such as a pulse motor can be used. Furthermore, as the image sensor driving systems 33L, 33R, means such as those made of piezo-electric element and piezo-electric bimorph or the like can be used.

Figure 13:
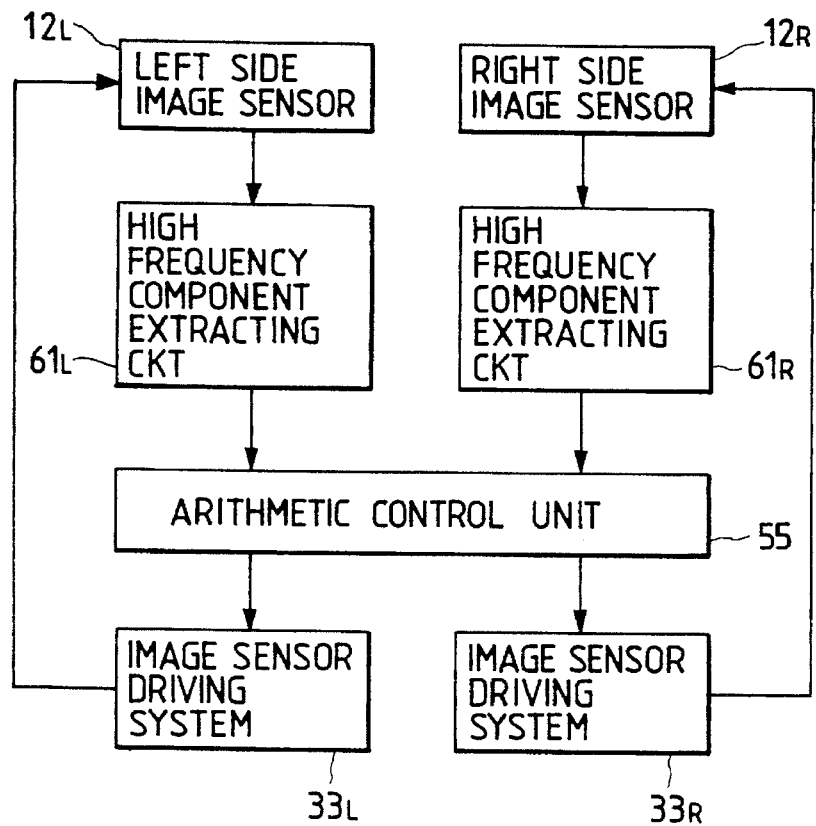
FIG. 13 is a block diagram for explanation of the operation of the arithmetic control unit in another embodiment of the multi-lens imaging apparatus according to this invention.

FIG. 13 is a block diagram for the explanation of the operation of the arithmetic control unit according to a third embodiment of the multi-lens imaging apparatus of the present invention.

In the multi-lens imaging apparatus according to the second embodiment shown in FIG. 9, the arithmetic control unit 35 as shown in FIG. 9B has controlled the image sensor driving systems 33L and 33R in accordance with the signals from the rotational 10 angle detecting means 28L, zoom encoder 31L and the focus encoder 32L of the left-side imaging system 10L and the signals from the rotational angle detecting means 28R, zoom encoder 31R and the focus encoder 32R of the right-side imaging system 10R respectively. Meanwhile, in the multi-lens imaging apparatus of this embodiment, the arithmetic control unit 55 controls the image sensor driving systems 33L,. 33R in accordance with the image signals supplied from the left-side imaging system 10L and the right-side imaging system 10R.

Namely, when the left-side image sensor 12L and the right-side image sensor 12R are slightly oscillated (rotated) in the sine-wave form by the image sensor driving systems 33L, 33R, the high-frequency components of the image signals output from the left-side image sensor 12L and the right-side image sensor 12R attenuate as the image sensors 12L, 12R defocus from the surface conjugated with the object surface 2, while, on the contrary, increase as the left-side image sensor 12L and the right-side image sensor 12R close to the surface conjugated with the object surface 2. In view of this principle, by detecting the high-frequency component of the image signals output from the left-side image sensor 12L and the right-side image sensor 12R, the gradient direction and the optimum gradient angle of the surface conjugated with the object surface 2 can be obtained.

Accordingly, in the multi-lens imaging apparatus according to this embodiment, the arithmetic control unit 55 slightly rotates the left-side image sensor 12L and the right-side image sensor 12R through the image sensor driving systems 33L and 33R respectively, and extracts the high-frequency components of the image signals from the left-side image sensor 12L and the right-side image sensor 12R through the high-frequency component extracting circuit 61L and 61R such as band-pass-filter circuit. The arithmetic control unit 55 recognizes the gradient direction and the optimum gradient angle of the left-side image sensor 12L and the right-side image sensor 12R from the extracted high-frequency components of the image signals, and controls the image sensor driving systems 33L, 33R in accordance the recognized result.

As mentioned above, according to the multi-lens imaging apparatus of this present invention, it is possible to form sharp images on the left-side image sensor 12L and the right-side image sensor 12R using the image signals from the left-side image sensor 12L and the right-side image sensor 12R respectively. Further, the multi-lens imaging apparatus of this embodiment is also effective even when the object surface 2 is not forwardly opposed to the global imaging system (i.e. leaned photographing), as can be understood from the aforementioned principles.

The present invention is not limited to the aforementioned embodiments, and a variety of alternative synthesizations are possible without departing from the subject matter of the present invention.

For example, in the illustrated embodiments, the present invention has been applied to an apparatus for providing highly fine images, however, is applicable to any other apparatus which has a plurality of imaging optical systems and a gradient of the optical axis of at least one of the optical systems can be varied, such as a panorama imaging apparatus, 3D imaging apparatus and 2D–3D hybrid imaging apparatus or the like.

In addition, instead of inclining the photosensitive surface for accrording the photosensitive surface of the image sensor with the imaging surface of the object, the imaging surface of the object may be inclined to accord with the photosensitive surface by appropriately designing the imaging optical system.

The multi-lens imaging apparatus of the present invention can be utilized to be connected to display apparatus such as CRT through image processing apparatus so as to produce panorama TV, stenographic TV, HDTV system or the like. In addition, it is also possible to connect the multi-lens imaging apparatus of this invention to a recording apparatus through likewise an image processing apparatus to form a high-performance recording system, in the same manner.

In view of simplifying the composition, only one sensor has been provided on each imaging optical system, i.e. a single plate type has been shown, but alternatively it is also possible to compose it as a two-plate type using a color-decomposing optical system or as a three-plate type, of course.

In this manner, according to the present invention, the multi-lens imaging system comprises a plurality of imaging optical systems in each of which an angle formed by optical axes thereof varies by inclining an optical axis of at least one optical system and a plurality of image sensing means for detecting an image of an object imaged through the imaging optical systems, wherein a photosensitive surface of the image sensing means corresponding to the at least one optical system is inclined toward the optical axis, and the inclined angle is set between an imaging surface being conjugated with the subject surface in the first state and an imaging surface being conjugated with the object surface in the second state. As a result, any unsharpness generating at the periphery portions of the screen can be reduced, compared to the conventional apparatus.

Further, in this invention, the maximum unsharpness amount generating at the periphery portions of the screen can be reduced approximately to a half by inclining the photosensitive surfaces of the image sensors with respect to a surface perpendicular to the optical axes of the imaging systems by an amount of:

$$0.5 \cdot \tan^{-1}\{\beta_0 \cdot \tan(\theta_0)\}$$

In addition, according to the invention, the double-eye imaging apparatus comprises a plurality of imaging optical systems in which an angle formed by optical axes varies and a plurality of image sensing means for detecting an image of an object through the imaging optical systems, and a means for substantially according the gradient of the imaging surface of the object imaging through the imaging optical systems and the gradient of the photosensitive surface of the image sensing means in response to the change of the angle formed by the aforementioned optical axes. In consequence, it is possible to prevent the unsharpness from generating for all over the screen, irrespective of a distance to the object.

What is claimed is:

1. A multi-lens imaging apparatus comprising:

a first imaging optical system;

a second imaging optical system;

a convergence angle changing mechanism for changing a convergence angle between said first and second imaging optical systems;

wherein said convergence angle is changed according to whether a plane of an object lies at a near distance or at a far distance, a first image sensor provided for said first imaging optical system;

wherein a plane of sensor of said first image sensor is disposed obliquely with respect to a plane normal to an optical axis of said first imaging optical system, a first sensor angle is an angle between a first near distance angle and a first far distance angle, wherein said first sensor angle is an angle made by said plane of said sensor of said first image sensor and said plane normal to said optical axis of said first imaging optical system, said first near distance angle is an angle made by a near distance imaging plane in conjugation with said plane of said object lying at said near distance by way of said first imaging optical system and said plane normal to said optical axis of said first optical system, said first far distance angle is an angle made by a far distance imagining plane in conjugation with said plane of said object lying at said far distance by way of said first imaging optical system and said plane normal to said optical axis of said first optical system, a second image sensor provided for said second imaging optical system;

wherein a plane of sensor of said second image sensor is disposed obliquely with respect to a plane normal to an optical axis of said second imaging optical system, a second sensor angle is an angle between a second near distance angle and a second far distance angle, wherein said second sensor angle is an angle made by said plane of said sensor of said second image sensor and said plane normal to said optical axis of said second imaging optical system, said second near distance angle is an angle made by a near distance imaging plane in conjugation with said plane of said object lying at said near distance by way of said second imaging optical system and said plane normal to said optical axis of said second optical system, said second far distance angle is an angle made by a far distance imagining plane in conjugation with said plane of said object lying at said far distance by way of said second imaging optical system and said plane normal to said optical axis of said second optical system; and an angle changing mechanism for changing at least one of said first and second sensor angles, wherein said angle changing mechanism changes at least one of said first and second angles according to a change of said convergence angle by said convergence angle changing mechanism; and wherein said angle changing mechanism adjust said sensor angles so that the plane in conjugation with said object is substantially consistent with the plane of said sensor.

2. An apparatus according to claim 1, wherein where a maximum value of said convergence angle is $2\theta_0$ and, maximum imaging magnification of each of said first and second imaging optical systems is $\beta_0$, at least one of said first and second sensor angles is substantially equal to $0.5 * \tan^{-1}\{\beta_0 * \tan(\theta_0)\}$.

3. An apparatus according to claim 1, further comprising storing means for image-processing an image signal from said first and second image sensors to store the image signal.

4. An apparatus according to claim 1, further comprising display mans for displaying a combined image combined by using the image signal from said first and second image sensors.

5. An apparatus according to claim 1, wherein said near distance is equal to a close distance and said far distance is equal to an infinite distance.

6. An apparatus according to claim 5, wherein where a maximum value of said convergence angle is $2\theta_0$ and, maximum imaging magnification of each of said first and second imaging optical systems is $\beta_0$, at least one of said first and second sensor angles is substantially equal to $0.5 * \tan^{-1}\{\beta_0 * \tan(\theta_0)\}$.

7. An apparatus according to claim 6, wherein said convergence angle changing mechanism adjusts each of said first and second imaging optical systems so that an optical axis of said each thereof is inclined by each $\theta_0$.

* * * * *